(12) United States Patent
August

(10) Patent No.: US 6,749,153 B1
(45) Date of Patent: *Jun. 15, 2004

(54) SURVIVABLE AND REUSABLE LAUNCH VEHICLE

(75) Inventor: Henry August, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/309,828

(22) Filed: Dec. 4, 2002

(51) Int. Cl.$^7$ .................................................. B04B 1/20
(52) U.S. Cl. ...................................................... 244/25 R
(58) Field of Search ........................ 244/45 R, 45 A, 244/25 R, 120, 113, 138, 133, 121

(56) References Cited

U.S. PATENT DOCUMENTS

| | | | | |
|---|---|---|---|---|
| 1,613,091 A | * | 1/1927 | Francis | 244/45 R |
| 1,939,682 A | * | 12/1933 | Fleming | 244/45 R |
| 3,517,584 A | | 6/1970 | Robinson et al. | |
| 3,603,533 A | * | 9/1971 | Stripling | 244/3.23 |
| 3,834,654 A | * | 9/1974 | Miranda | 244/13 |
| 3,981,460 A | * | 9/1976 | Ratony | 244/13 |
| 4,053,125 A | * | 10/1977 | Ratony | 244/46 |
| 4,090,681 A | * | 5/1978 | Zimmer | 244/45 R |
| 4,161,301 A | | 7/1979 | Beardsley et al. | |
| 4,164,199 A | * | 8/1979 | Pequegnat | 119/200 |
| 4,256,012 A | | 3/1981 | Cowart et al. | |
| 4,283,988 A | | 8/1981 | Edwards | |
| 4,365,773 A | * | 12/1982 | Wolkovitch | 244/45 R |
| 4,421,007 A | | 12/1983 | Hanes, Jr. | |
| 4,541,593 A | * | 9/1985 | Cabrol | 244/45 R |
| 4,739,957 A | * | 4/1988 | Vess et al. | 244/199 |
| 4,856,736 A | * | 8/1989 | Adkins et al. | 244/45 R |
| 5,090,642 A | | 2/1992 | Salkeld | |
| 5,279,199 A | | 1/1994 | August | |
| 5,320,306 A | * | 6/1994 | Gennaro | 244/45 R |
| 5,407,150 A | * | 4/1995 | Sadleir | 244/12.4 |
| 5,417,393 A | * | 5/1995 | Klestadt | 244/3.27 |
| 5,454,530 A | * | 10/1995 | Rutherford et al. | 244/7 A |
| 5,454,531 A | * | 10/1995 | Melkuti | 244/12.6 |
| 5,503,352 A | * | 4/1996 | Eger | 244/45 R |
| 5,577,431 A | | 11/1996 | Kusters | |
| 5,899,409 A | * | 5/1999 | Frediani | 244/13 |
| 6,231,002 B1 | | 5/2001 | Hibma et al. | |
| 6,308,913 B1 | * | 10/2001 | Fujino et al. | 244/45 R |

OTHER PUBLICATIONS

ONERA Information Brochure on Aerospace Research (2001–2002).

* cited by examiner

*Primary Examiner*—Charles T. Jordan
(74) *Attorney, Agent, or Firm*—Harness & Dickey & Pierce P.L.C.

(57) ABSTRACT

A reusable, mach-velocity mobile platform delivers a weapons payload via vertical launch, powerless glide, weapons release, and landing operation phases. The platform includes a generally tubular shaped body having an aft and forward end, and a payload section. An arch wing is supported by the body aft end. The arch wing has an upper and a lower wing joined at distal ends by two curved end plates. A nose assembly is connected at the forward end having an upward directed fixed angle-of-attack to generate forward end lift. Thermal tiles attached under the body and the lower wing under-side radiate/dissipate heat generated during a high angle-of-attack platform reentry. Radar absorptive or radar translucent material is used. The platform preferably discharges payload from the aft end for safe separation. A landing gear is extended for the landing phase of operation.

25 Claims, 12 Drawing Sheets

Outboard, Stilt-Like Steering Device Provides A Gapped, Stand-Off Region Allowing Boundary Layer Flow To Propagate Through

SURVIVABLE AND REUSABLE LAUNCH VEHICLE

FIELD OF THE INVENTION

The present invention relates in general to air vehicles and more specifically to a reusable weapon delivery air vehicle having an arch wing.

BACKGROUND OF THE INVENTION

Reusable launch vehicles including the space shuttle are known. Weapon delivery systems which are self guided following launch of the system are also known. An example of this type of system includes the cruise missile. The cruise missile is normally rocket launched from a stationary or mobile platform and includes its own internal navigation equipment to enable the cruise missile, given its originating location coordinates, to identify and fly under its own power to a specific target. The cruise missile is very effective at delivering relatively small explosive payloads to a target. Disadvantages of the cruise missile include: (1) it travels at subsonic velocities and is susceptible to being detected and destroyed by enemy fire; (2) it includes its own engine and fuel, reducing its payload; (3) it can strike against a single target only; and (4) it is not a reusable platform.

It is therefore desirable to provide a reusable air vehicle having improved survivability and a reduced detection signature, which carries no propulsion system, but is operable at high altitudes and travels at higher than sonic speed. It is also desirable to provide a reusable air vehicle to reduce the operating costs of delivering a weapons payload.

SUMMARY OF THE INVENTION

According to a preferred embodiment of the present invention, a Mach-velocity reusable launch vehicle (RLV) is provided which has an independently propelled launch phase, a powerless glide phase, a weapons release phase, and a landing phase. The RLV includes a generally tubular shaped body having an aft end and a forward end, and a payload section. An arch wing is supported by the body aft end. The arch wing has an upper and a lower wing joined at distal ends by two curved end plates. A forward steering device is provided as a pair of flight control surfaces mounted on opposed sides of the RLV at about the horizontal centerline. A nose assembly is connected at the RLV forward end having an upward-directed, fixed angle-of-attack to generate forward end lift. Radar absorptive and translucent materials are used throughout the RLV. A rear-launch system is preferably provided to discharge a weapons payload.

The RLV of the present invention is preferably launched as known in the art by attachment to a rocket propelled vehicle capable of releasing the RLV at hypersonic velocity (i.e., Mach 3 and higher) and to an altitude of 100,000 ft or greater. The RLV achieves maximum elevation and velocity during the launch phase, disengages from the launch platform, reenters the atmosphere (if necessary) at a predermined angle-of-attack, and thereafter travels to a pre-designated location in a powerless glide phase. In a preferred embodiment, to reduce the chance of detection and to permit weapons release at more than one location, the RLV maintains hypersonic velocity during the glide phase and the weapons release phase by discharging its payload from the aft end. Following the weapons release phase, and during the landing phase the RLV is steered toward a landing area remote from the weapons release location(s). Landing gear extend from the underwing for the landing phase.

Thermal insulation attached under the body and the lower wing under-side absorbs/dissipates heat generated during RLV atmospheric re-entry. A high angle-of-attack is maintained and the temperature generated by the hypersonic velocity of air moving under the RLV is dissipated by the thermal insulation materials which protects the vehicle's lower surfaces and shields the upper body and the upper wing of the arch wing from the airstream's thermal impact.

Similar features to the arch wing, the forward steering device, and the landing gear are also described in U.S. patent application Ser. No. 10/200,692, filed Jul. 22, 2002, which is incorporated herein by reference.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
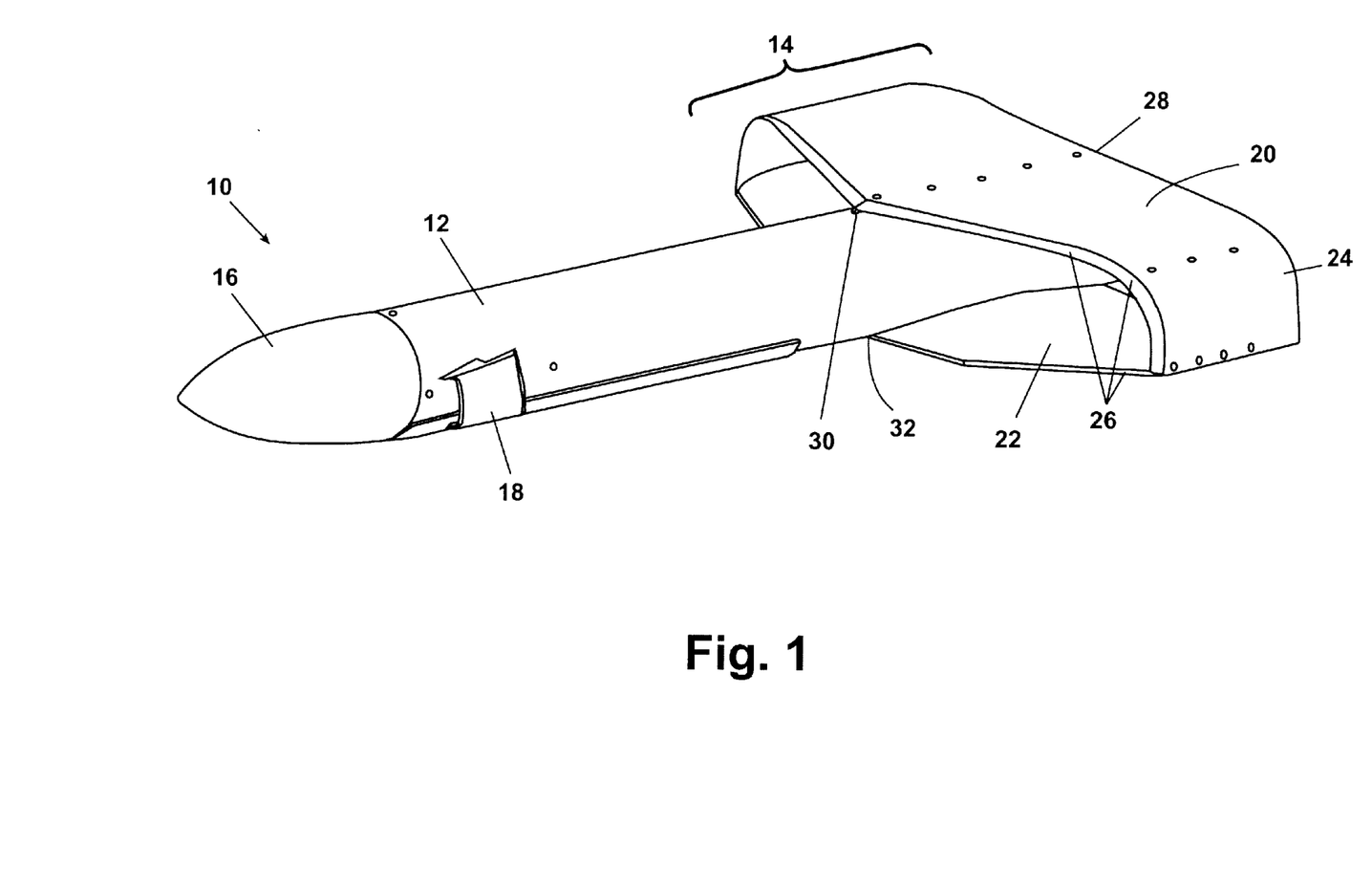
FIG. 1 is a perspective view of a preferred embodiment of a reusable launch vehicle of the present invention.

Referring to FIG. 1, in accordance with a preferred embodiment of the present invention, a reusable launch vehicle (RLV) 10 includes a body 12, an arch wing 14, and a nose assembly 16. The body 12 has a generally tubular shape which supports the arch wing 14 at an aft end of the body 12. The body 12 also supports the nose assembly 16 at a forward end of the body 12. A forward steering device 18 is mounted on the body 12 and is rotatably disposed such that the steering device 18 creates side thrust at the forward end of the body 12 when displaced from its stowed position shown.

The arch wing 14 includes an upper wing 20, a lower wing 22, and a pair of curved end plates 24 joining distal ends of each of the upper wing 20 to the lower wing 22. Each of the upper wing 20, the lower wing 22, and the curved end plates 24 include rounded leading edges 26 and squared trailing edges 28, respectively.

The upper wing 20 has a swept wing design which will be discussed further in reference to FIG. 2. An upper wing point-of-contact 30 is formed between the upper wing 20 and the body 12. From the upper wing point-of-contact 30, the upper wing leading edges 26 each taper back to a forward facing point of the curved end plates 24. The upper wing 20 is supported from an upper surface of the body 12 and has a generally planar shape. The lower wing 22 also has a swept wing design which will be discussed further in reference to FIG. 2. The lower wing 22 has a lower wing point-of-contact 32 at a forward leading edge of the lower wing 22 at a junction with the body 12. From the lower wing point-of-contact 32, the lower wing leading edges 26 each taper back to a forward facing point of the curved end plates 24. Similar to the upper wing 20, the lower wing 22 is supported from a lower surface of the body 12.

Figure 2:
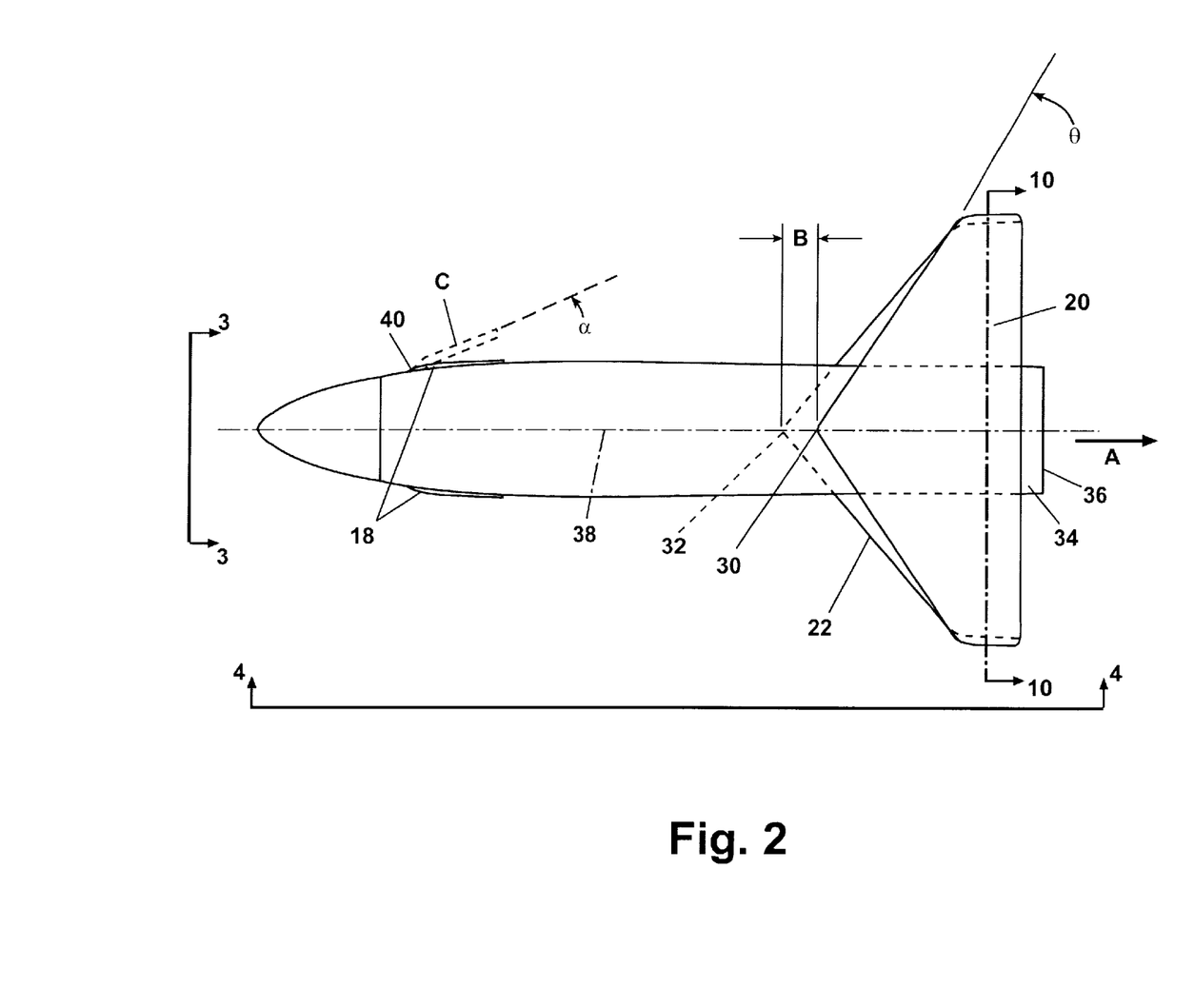
FIG. 2 is a plan view of the reusable launch vehicle shown in FIG. 1.

Referring now to FIG. 2, a body aft end 34 extends aft of the upper wing 20 and provides a payload discharge face 36. The payload carried by the RLV 10 exits in a payload discharge direction A as shown.

As noted above, the upper wing 20 is connected to the body 12 at the upper wing point of contact 30. The swept wing shape of the upper wing 20 includes a swept wing angle $\theta$ measured from a body longitudinal centerline 38. The swept wing angle $\theta$ is fixed for each arch wing design, and can vary between approximately 20° to approximately 60°. The lower wing point of contact 32 is formed at the body 12 along the body longitudinal centerline 38. The lower wing 22 displaces forward of the upper wing 20 by a lower wing extension length B as shown. The advantage of providing the lower wing extension length B will be discussed in reference to FIG. 5. The lower wing 22 is also a swept wing having an angle within the range of the swept wing angle $\theta$.

At a forward end of the body 12 the steering devices 18 are mounted on opposed sides of the body 12. Each of the steering devices 18 rotate at a rotation point 40 to permit a steering device deployment angle $\alpha$ as shown. The steering device deployment angle $\alpha$ forms an angle measured from the body longitudinal centerline and ranges from approximately 0° to approximately 30° when the steering device 18 reaches the steering device deployed position C (shown in phantom).

Figure 3:
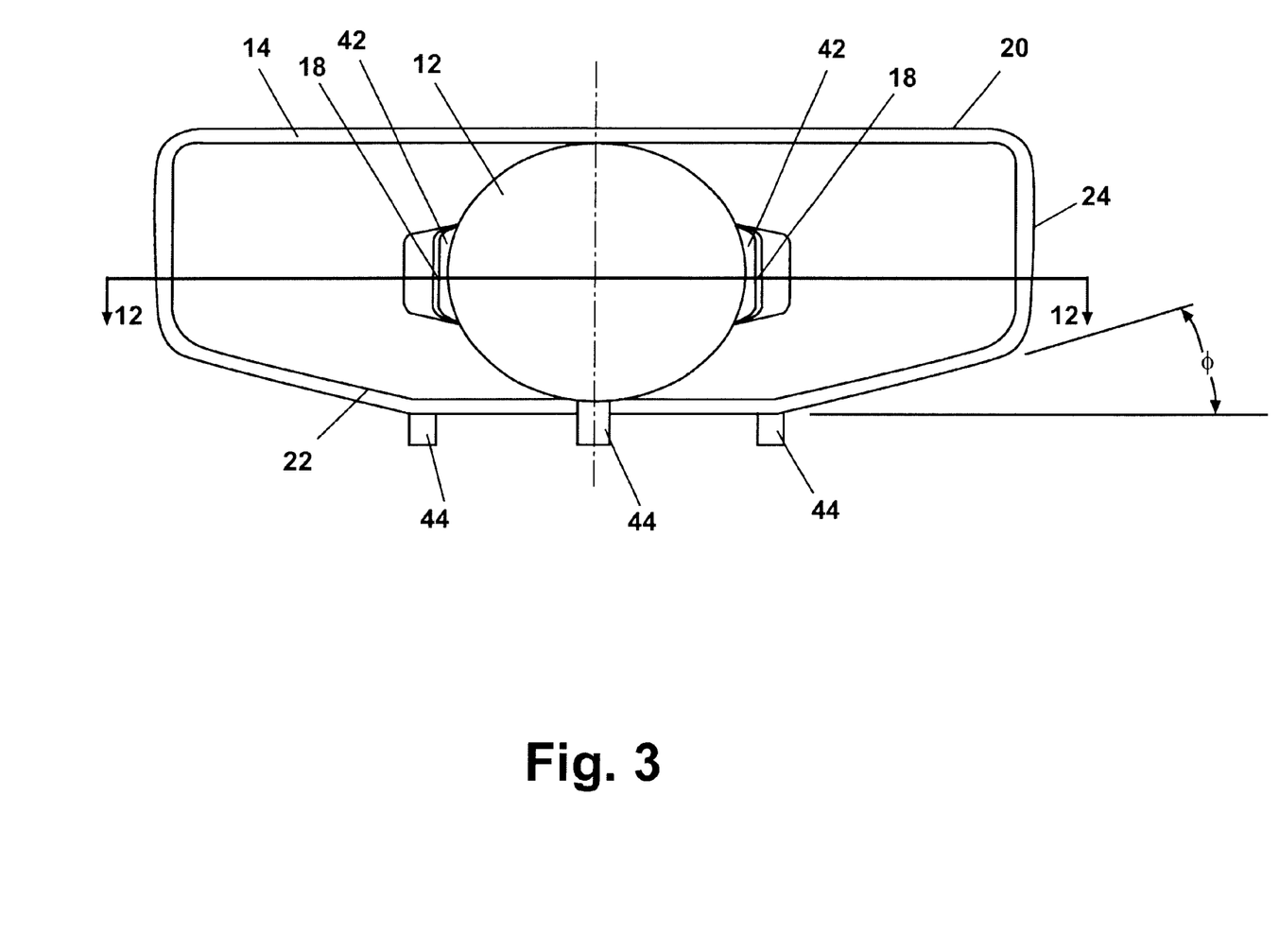
FIG. 3 is an end elevation view taken along directional line 3—3 of FIG. 2 identifying the general shape of the arch wing of the present invention.

Referring to FIG. 3, the design of the arch wing 14 is provided in greater detail. The upper wing 20 has a generally planar shape horizontally mounted from an upper surface of the body 12. The curved end plate 24 is provided to join distal ends of both of the upper wing 20 and the lower wing 22. The curved end plate 24 serves several purposes, including: (1) the curved shape is a structurally efficient form for joining the upper wing 20 to the lower wing 22; (2) the curved end plate 24 prevents high pressure air from the underside of the lower wing 22 from spilling about the distal end of the lower wing 22 to the upper side of the lower wing 22; and (3) providing curved surfaces to join the upper wing 20 to the lower wing 22 increases the directional stability of the air vehicle. The lower wing 22 is provided with a horizontal portion adjacent to the lower wing attachment point to the body 12. Outboard of the horizontal portion of the lower wing 22, the lower wing 22 includes a dihedral angle $\phi$ commonly employed for aircraft wings. The dihedral angle $\phi$ ranges from approximately 0° to approximately 15°. In another preferred embodiment (not shown), the upper wing 20 can also include the dihedral angle $\phi$.

FIG. 3 also shows each of the steering devices 18 in their fully deployed position. When deployed, an air flow clearance 42 is provided between the outer surface of the body 12 and an inner surface of each of the steering devices 18. The air flow clearance 42 provides for high velocity air flow in this standoff region which allows boundary layer air to propagate through the entire length of the steering devices 18, increasing its steering effectiveness when these devices are deployed. FIG. 3 also shows a landing gear set 44 in its deployed position. The landing gear set 44 is normally stowed during the launch and the powerless flight phases of the operation of the RLV 10. The landing gear set 44 can include skis, struts, or wheels. An exemplary quantity of three components are shown for the landing gear set 44. Two of the components are disposed in the lower wing 22 and a third component is disposed at a lower portion of the forward end of the body 12. Each component of the landing gear set 44 is provided with a mechanism (not shown) to deploy and retract the landing gear set 44.

Figure 4:
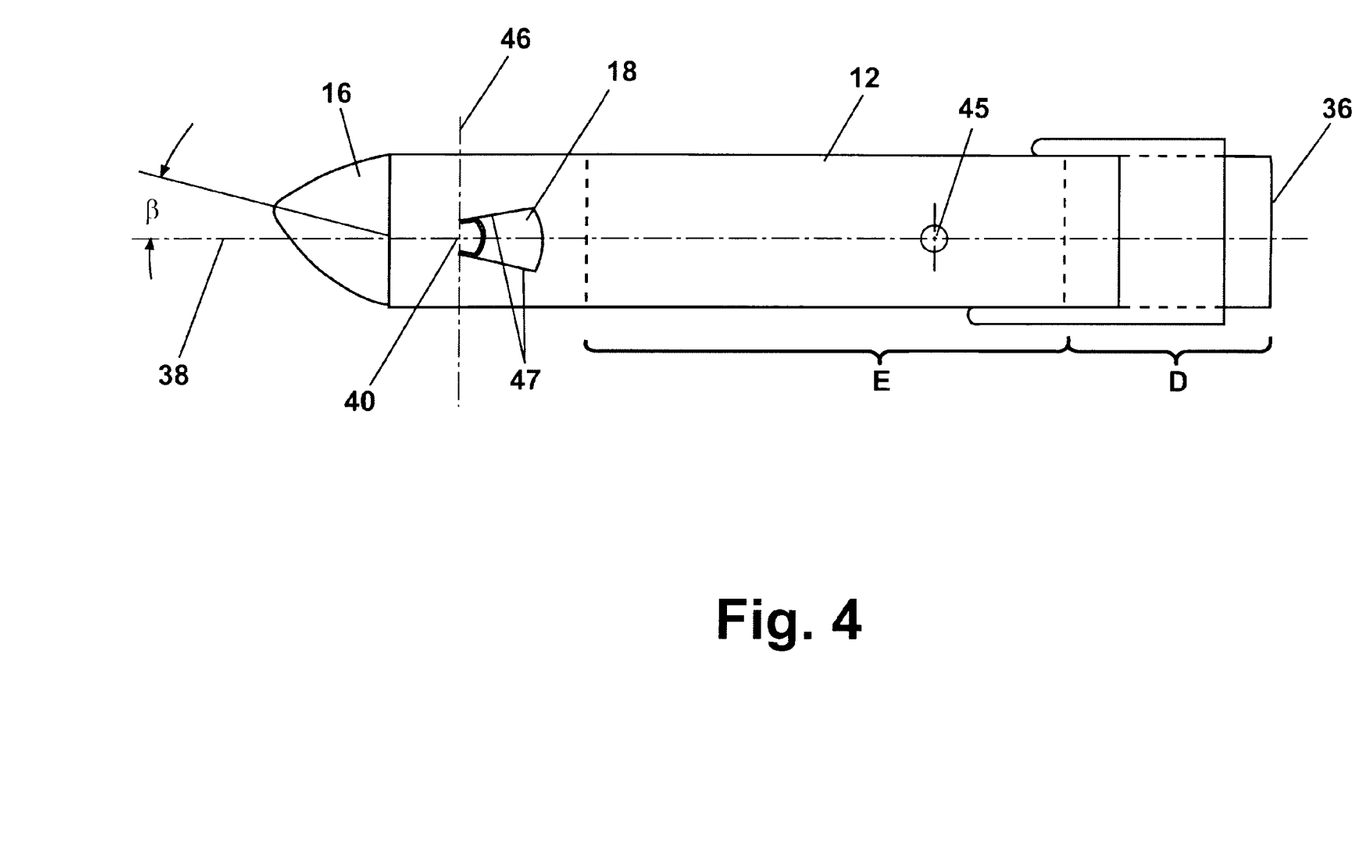
FIG. 4 is a side elevation view taken along directional line 4—4 of FIG. 2 showing the nose assembly angle-of-attack angle as well as locations for the payload section and payload release section.

Referring to FIG. 4, both the steering device 18 and the nose assembly 16 are shown in greater detail. The nose assembly 16 is provided as an ogive form having a forward tip displaced at an angle $\beta$ above the body longitudinal centerline 38. The nose angle $\beta$ is fixed when the nose assembly 16 is disposed on the body 12. A plurality of designs for the nose assembly 16 can be used, providing the nose angle $\beta$ ranging from approximately 0° to approximately 12° above the body longitudinal centerline 38. The purpose for the nose angle $\beta$ is to provide upward thrust by creating an angle-of-attack at the forward end of the body 12. The additional lift provided by the nose angle $\beta$ helps to compensate for the aft location of the arch wing 14 which is provided aft of the RLV 10 center of gravity 45. The steering device 18 includes two edges 47 formed above and below the body longitudinal centerline 38. Each of the edges 47 are disposed at an angle from the body longitudinal centerline 38 of approximately 10° to approximately 20°. A joint at the forward end of each of the steering devices 18 is attached to the body 12 such that the steering devices 18 rotate about a rotation axis 46.

FIG. 4 also shows in phantom a payload discharge section D and a payload stowage section E. In a preferred embodiment, the payload stowed in the payload stowage section E is displaceable through the payload discharge face 36. To provide for an aft discharge from the RLV 10, a portion of the payload stowage section E can overlap the payload discharge section D providing clearance for the payload to pass within and through the payload discharge section D. Additional components (not shown) are stowed in the RLV 10 including navigation equipment, power sources, and additional control and operational systems. These components are common to reusable platforms or weapon delivery vehicles and are thus not shown for clarity.

Figure 5:
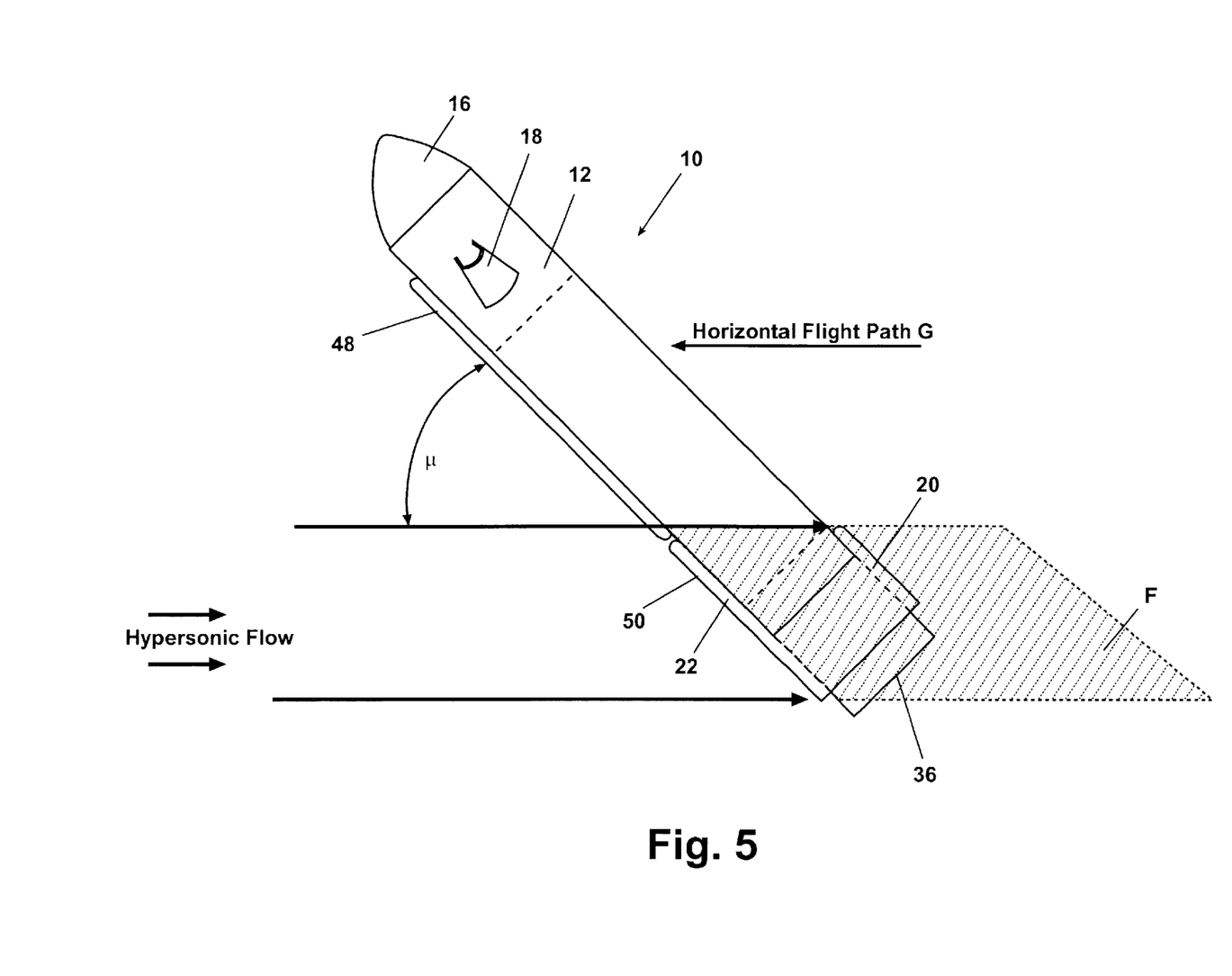
FIG. 5 is a side elevation view similar to FIG. 4 showing the reusable launch vehicle during a re-entry phase following the vertical launch.

Referring to FIG. 5, the RLV 10 is shown during a re-entry portion of the powerless flight phase. The RLV 10 is operable at hypersonic speeds, therefore following launch, the RLV 10 is designed to dissipate the heat of re-entry at lowered hypersonic speeds by re-entering at a high angle-of-attack $\mu$ as shown. The angle-of-attack $\mu$ ranges between approximately 30° to approximately 60°. A thermal insulation layer 48 is disposed on an underside of the body 12. A similar wing thermal insulation 50 is disposed on an undersurface of the lower wing 22. The thermal insulation layer 48 and the wing thermal insulation layer 50 are preferably silicon-based materials similar to those used on reusable platforms known in the art. The wing thermal insulation layer 50 radiates heat outwardly when passing through a hypersonic flow field as shown. By displacing the lower wing 22 forward of the upper wing 20, when the RLV 10 is operated at the angle-of-attack $\mu$ for re-entry, the lower wing 22 provides a shielded flow region F wherein hypersonic flow generated temperatures are avoided due to shielding of the upper wing 20. Thermal insulation material is therefore not required on the upper wing 20. The high angle-of-attack $\mu$ is used at reentry velocities above approximately Mach 10. At velocities below approximately Mach 10, the high angle-of-attack $\mu$ is not required. A horizontal flight path is indicated by arrow G.

Figure 6:
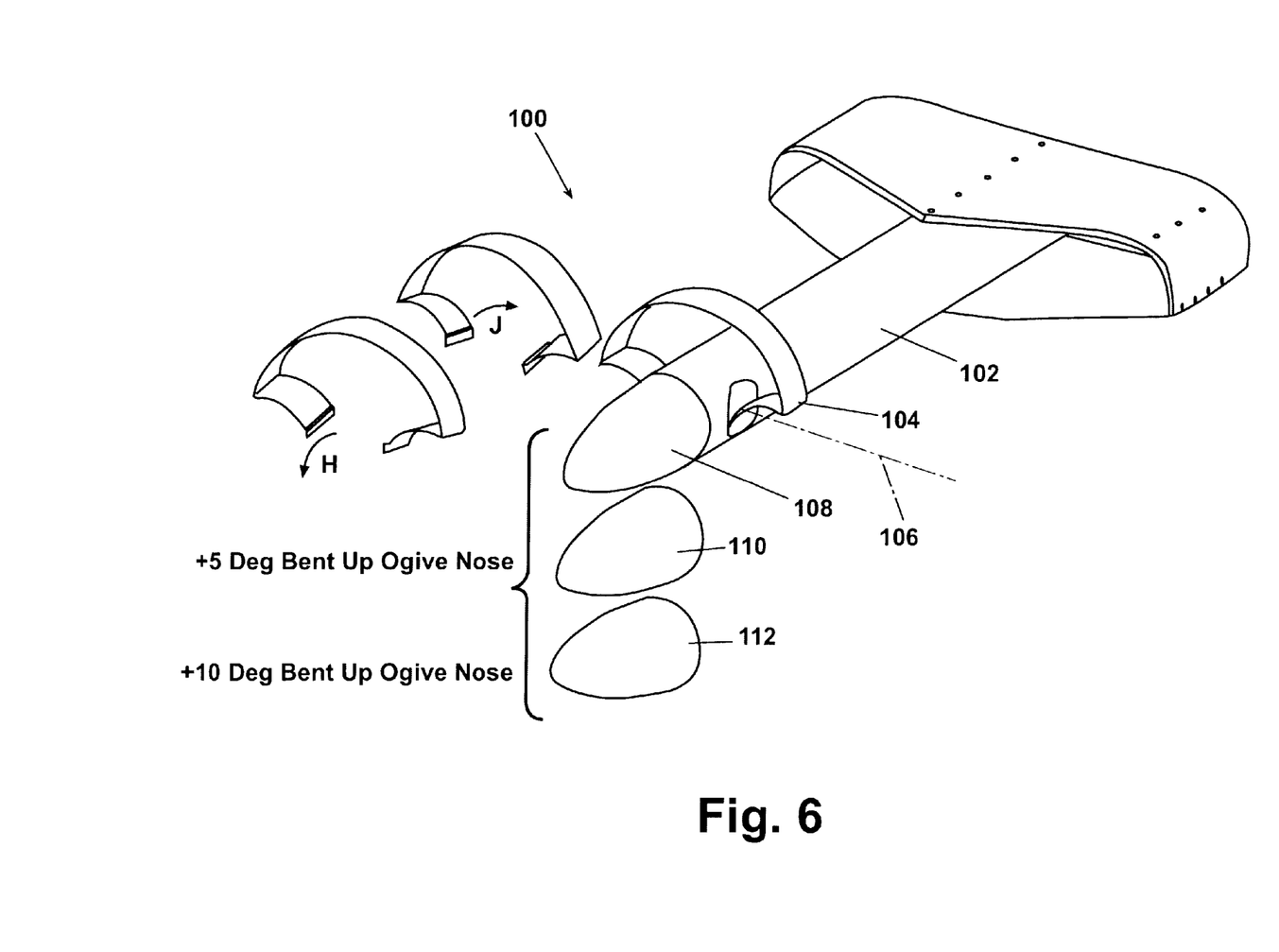
FIG. 6 is a perspective view of another preferred embodiment of the present invention which includes a ring canard and a plurality of ogive nose sections selectable for use on the reusable launch vehicle.

Referring to FIG. 6, another preferred embodiment of a reusable platform 100 includes a body 102 having a ring canard 104 rotatably attached in place of the steering device 18 (shown in FIG. 1). The ring canard 104 is disposed about a canard axis-of-rotation 106. Each of the starboard and port sides of the ring canard 104 can be actuated in unison or independently of each other. By rotating the ring canard 104 about the canard axis-of-rotation 106, the ring canard 104 deflects as shown in the exemplary forward rotation direction H and the aft rotation direction J. By selectively rotating the ring canard 104, forward attitude control of the reusable platform 100 is obtained.

In a preferred embodiment, the ring canard 104 is initially stowed during the launch phase of operation. The stowed position (not shown) provides the ring canard 104 wrapped generally about the perimeter of the body 102. A mechanism (not shown) releases the ring canard and a spring tension inherent in the design displaces the ring canard 104 into its operating position shown. Materials for the ring canard 104 can include spring steel and composite materials capable of producing the spring force necessary to position and hold the ring canard 104 in its operating position.

FIG. 6 also shows a plurality of exemplary designs for a nose assembly. A 0° ogive nose 108 is shown installed on the body 102. A positive 5° ogive nose 110 and a positive 10° ogive nose 112 are also shown. Accordingly, a plurality of individual nose assemblies can be installed on the body 102 to affect the lift force generated by the nose assembly.

Figure 7:
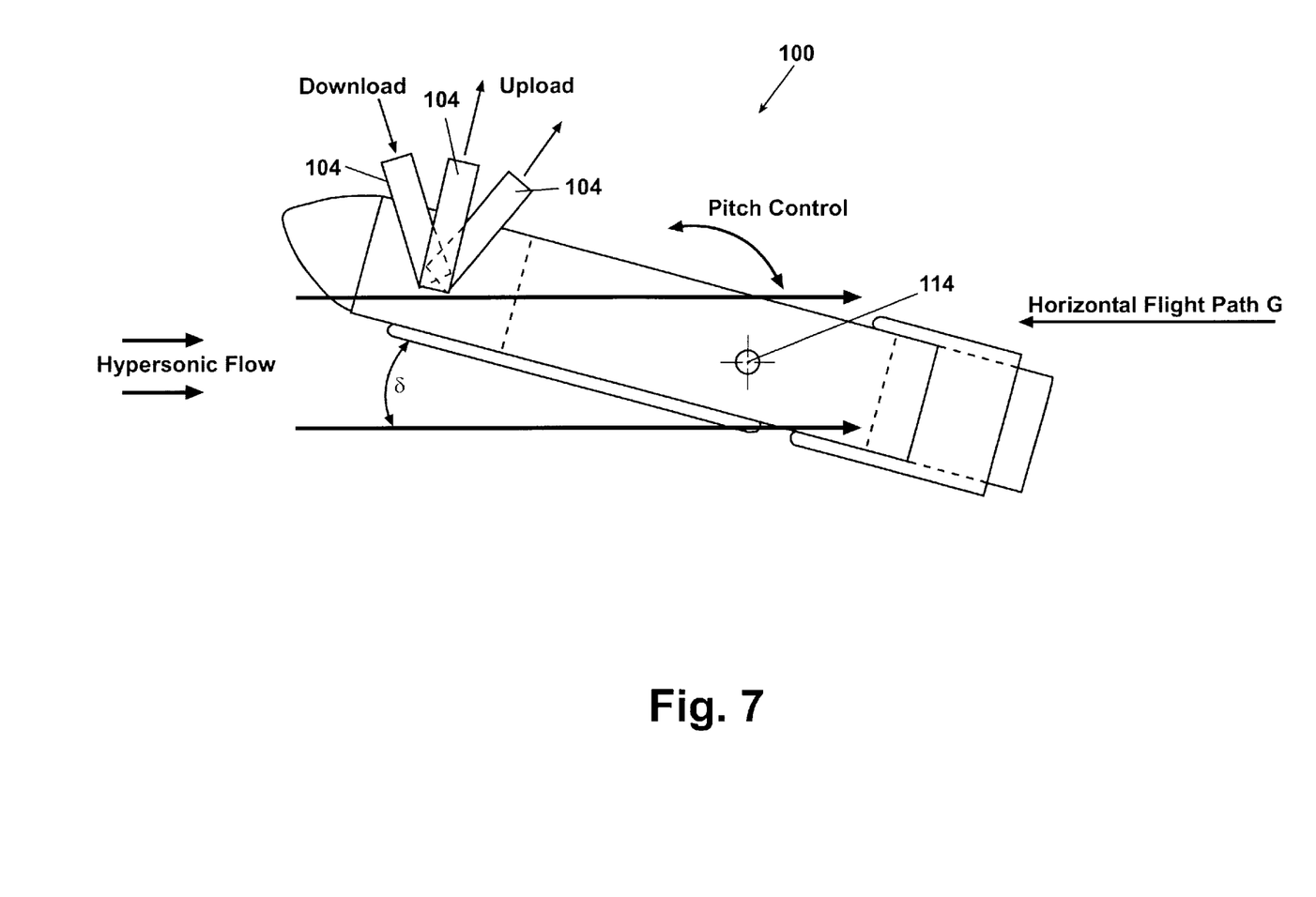
FIG. 7 is a side elevation view similar to FIG. 5 showing the alternate embodiment ring canards of FIG. 6 and their capability to control pitch of the reusable launch vehicle.

Referring to FIG. 7, an elevation view showing the reusable platform 100 of FIG. 6 is provided. The ring canard 104 is shown in each of 3 potential operating positions when rotated about the canard axis of rotation 106 (shown in FIG. 6). In a forward rotated position a download is applied to the reusable platform 100 via the ring canard 104. In a neutral or centrally vertical position, the ring canard 104 will produce additional upload as shown if the reusable platform 100 is operating at or above an operating angle-of-attack $\delta$ as shown. If the reusable platform 100 is operating at a horizontal flight path indicated by horizontal flight path direction arrow G, a central or perpendicular position of the ring canard 104 will generate no load on the reusable platform 100. In the horizontal flight path G, an aft positioned ring canard 104 will produce an upload for the reusable platform 100. The advantage of the ring canard 104 is the capability of producing either an upload or a download depending upon the rotated position. The upload or download force is applied at the forward end of the reusable platform 100 and acts to rotate the reusable platform 100 about the platform center of gravity 114. This provides pitch control for the reusable platform 100. By rotating individual sides of the ring canard 104 in the forward rotation angle H and the aft rotation angle J (shown in FIG. 6), side force can be generated to turn the reusable platform 100 starboard or port.

Figure 8:
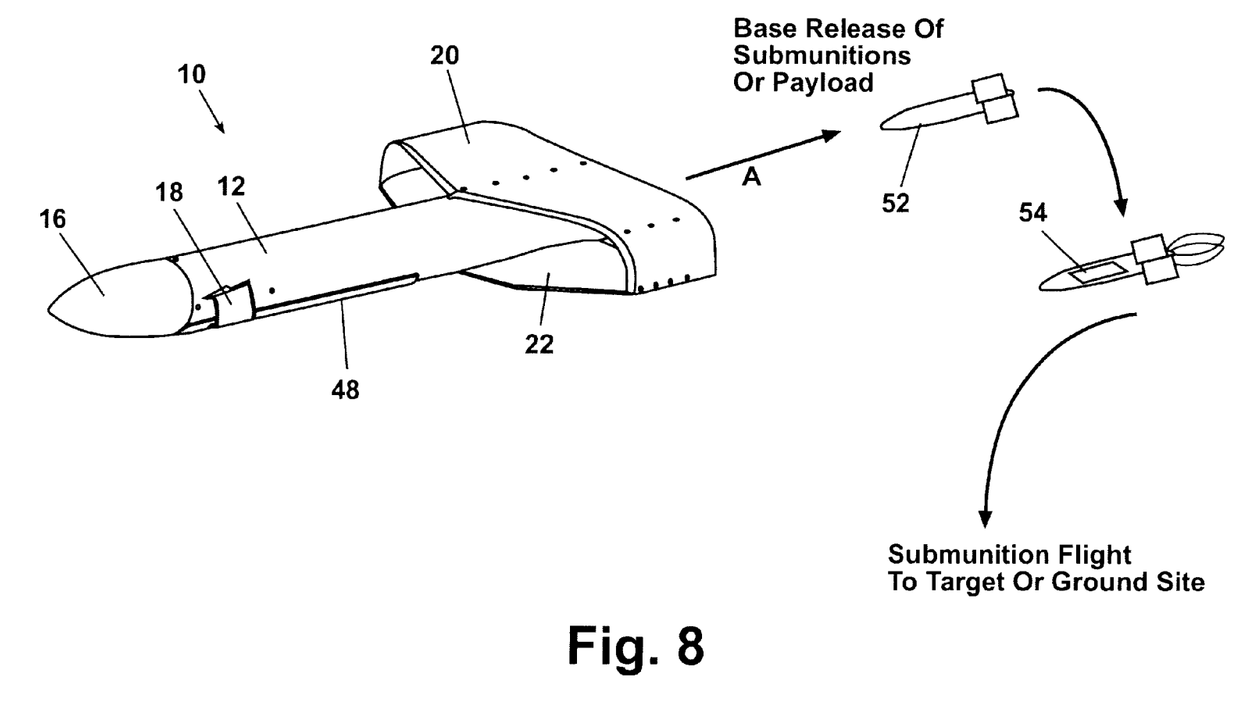
FIG. 8 is a perspective view showing a preferred rear release of payload from the reusable launch vehicle aft end.

As best seen in FIG. 8, in a preferred embodiment, the RLV 10 of the present invention discharges payload (e.g., sub-munitions) in a rear-release direction. During the weapons release phase, a payload 52 is released from the aft end of the RLV 10 in the payload discharge direction A. A plurality of known means can be used to discharge the payload 52. Exemplary means for discharge include using a drag parachute (not shown) to pull the payload 52 from its stowed position, or an ejection device (not shown) to propel the payload 52 in an aft direction, triggered either by an onboard signal or a remote signal received by the RLV 10. In the exemplary application of sub-munitions shown in FIG. 8, a sub-munition guidance system 54 as known in the art is employed for self propulsion of the payload 52 to a target or ground site. The RLV 10 can carry a plurality of payloads, and can deliver sub-payloads to multiple locations.

Figure 9:
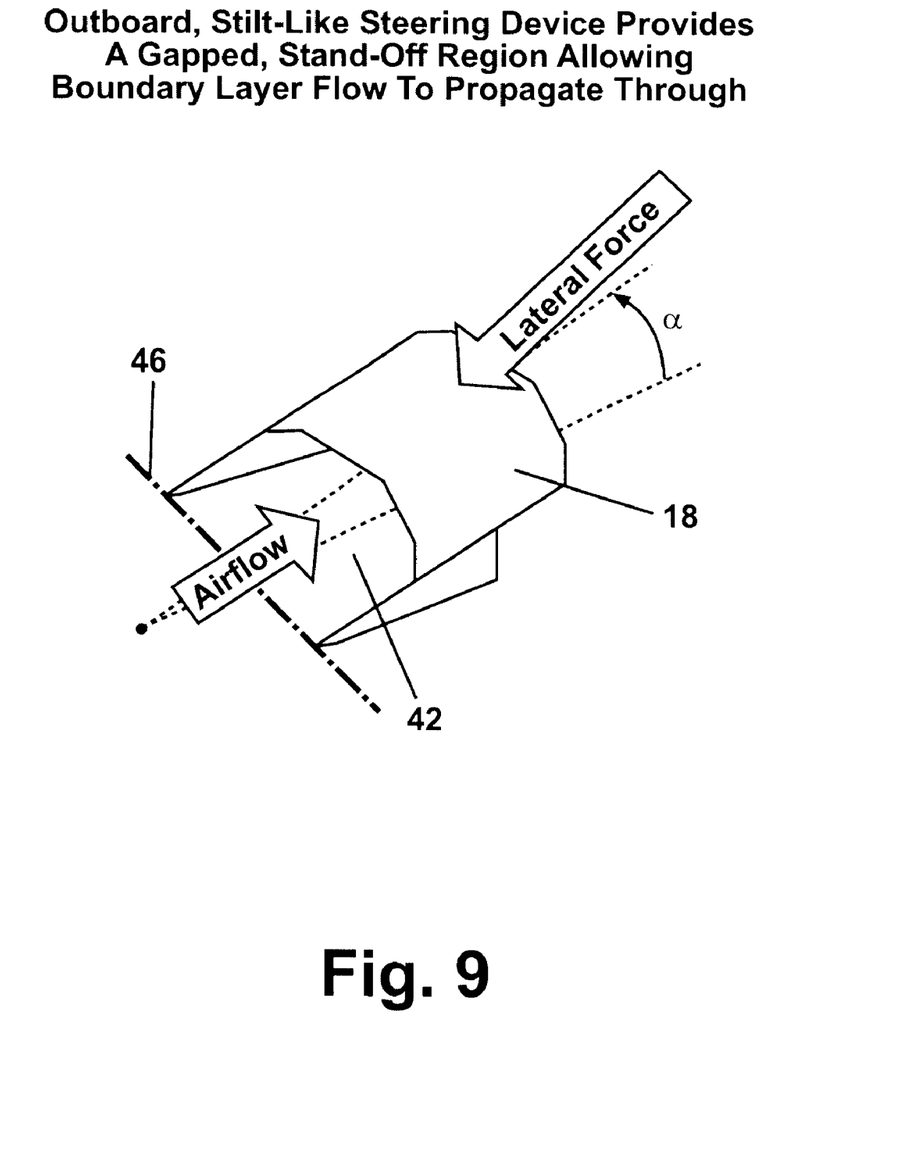
FIG. 9 is a perspective view of a preferred embodiment of a steering device of the present invention identifying a standoff clearance permitting boundary layer flow to propagate between the steering device and the external surface of the reusable launch vehicle.

Referring to FIG. 9, the steering device 18 shown in FIG. 1 is provided in greater detail. The steering device 18, when deployed in its steering device deployed position C (shown in FIG. 2), produces a lateral force which directs the forward end of the RLV 10 in the desired direction. At a steering device deployment angle $\alpha$, boundary layer air flow propagates through the air flow clearance 42 to maximize the effectiveness of the steering device 18. The steering device 18 rotates about a rotation axis 46 to achieve any steering device deployment angle $\alpha$ between approximately 0° to approximately 30°. Material for the steering device is preferably selected from the group of low dielectric materials able to reduce radar reflection.

Figure 10:
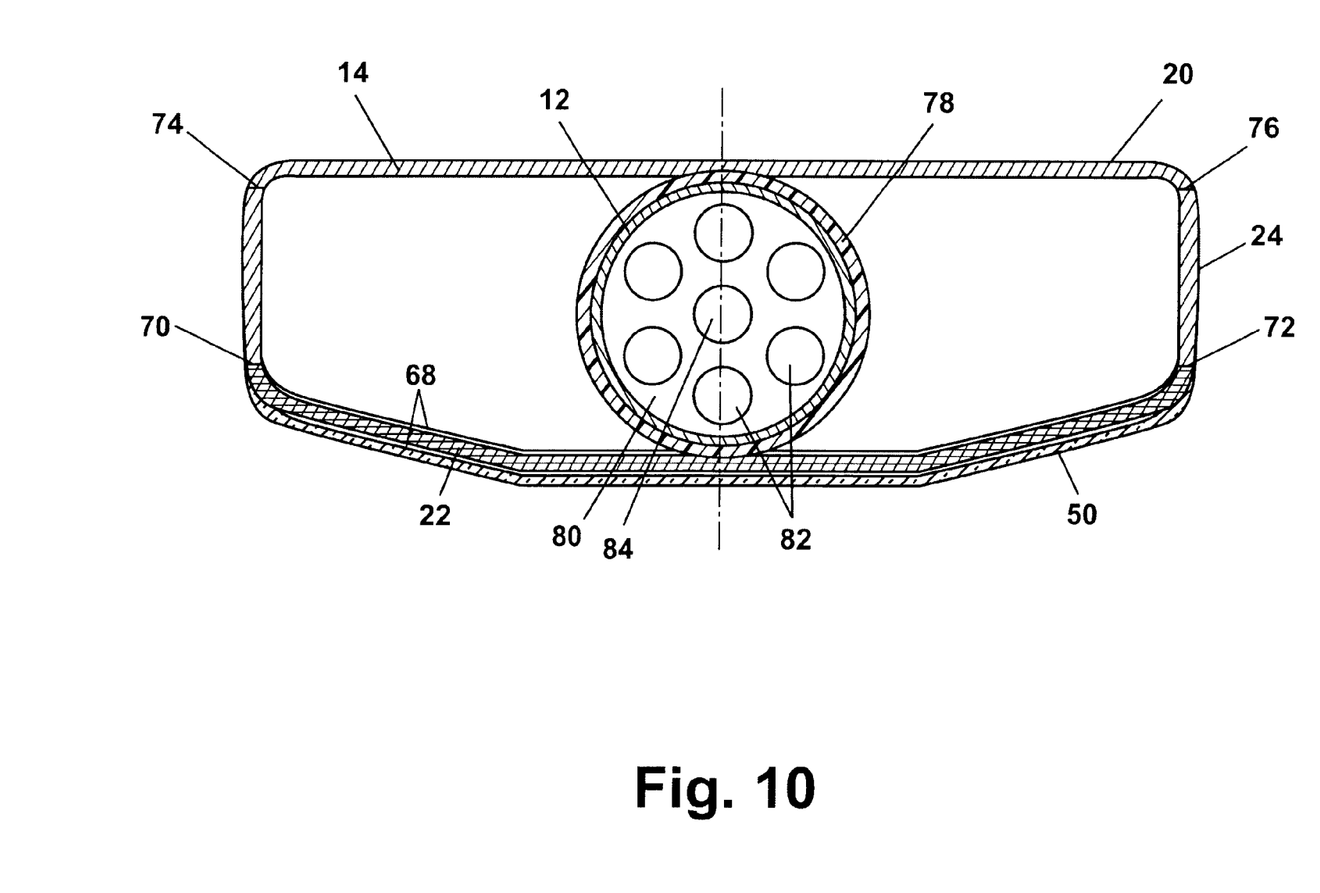
FIG. 10 is a section view taken at Section 10—10 of FIG. 2, showing radar absorbing/translucent materials applied to the RLV of the present invention.

Referring to FIG. 10, a cross section taken through the arch wing 14 and the body 12 shows exemplary material layers and an exemplary grouping of submunitions. The wing thermal insulation layer 50 is preferably a silica-based material to reflect reentry induced heating at the lower wing 22. The lower wing 22 can be constructed of metal, including titanium or aluminum, or a composite material, and preferably includes a radar absorbing material (RAM) layer 68 preferably coated on both surfaces of the lower wing 22, but at least those surfaces of the lower wing 22 not covered by the thermal insulation layer 50. The lower wing 22 is bonded (e.g., by adhesive) or mechanically joined (e.g., by rivets) to the curved end plates 24 at lower wing joints 70 and 72, respectively. The curved plates 24 are in turn bonded or mechanically joined to the upper wing 20 at upper wing joints 74 and 76, respectively. Because no metal structural members are required in their cross sections, the material for the curved plates 24 and the upper wing 20 is preferably a radar translucent material such as a low dielectric material.

FIG. 10 also shows that a RAM layer 78 is applied to the outer surface of the body 12. An exemplary payload cylinder 80 is shown in its installed position, having a plurality of sub-munition chambers 82. A stowage cylinder 84 is also shown, for stowing an inflatable tail cone and extendable shaft (items 404 and 406, respectively, shown and discussed in reference to FIG. 11).

Figure 11:
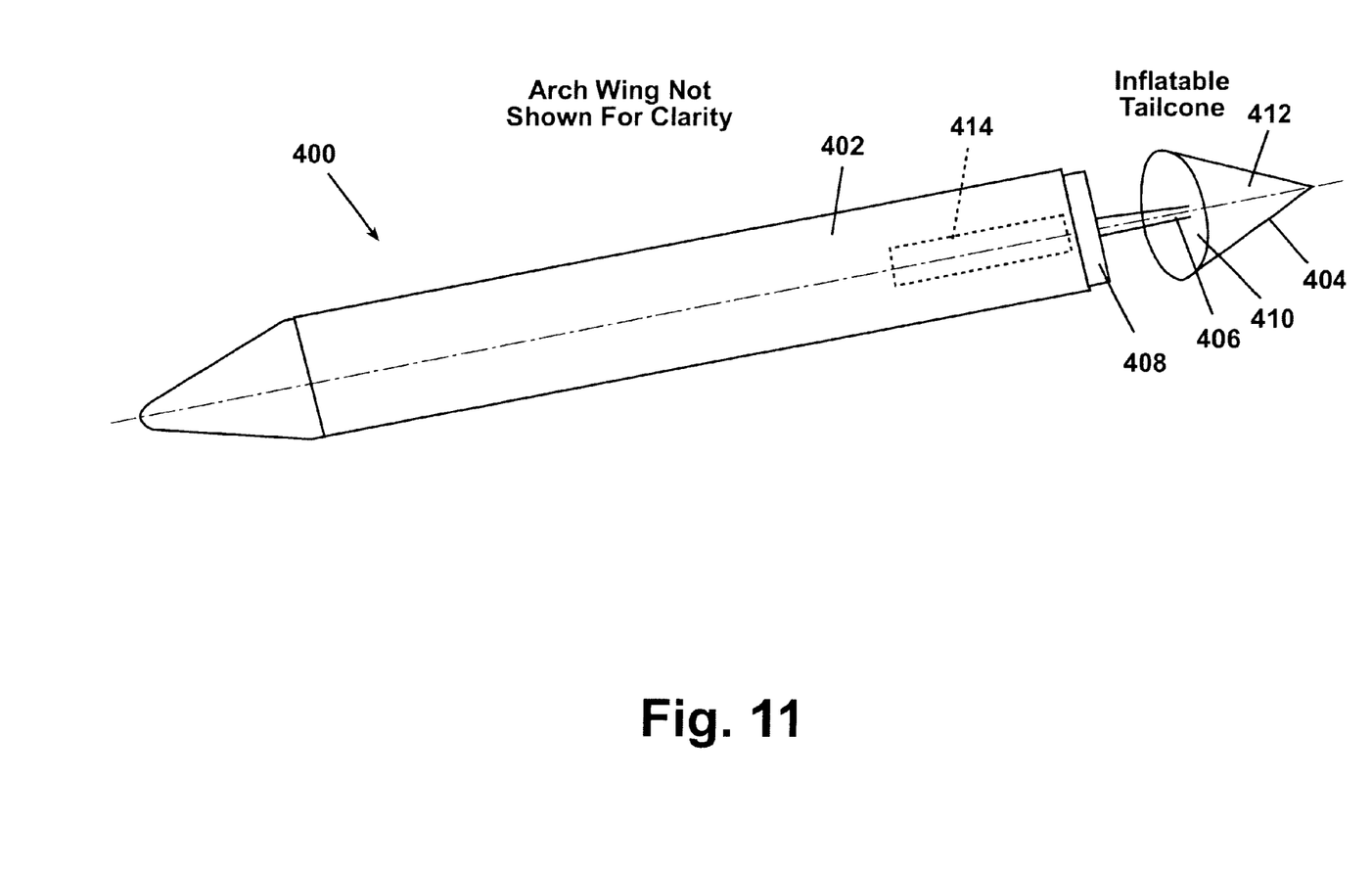
FIG. 11 is a perspective view of yet another preferred embodiment of the present invention having an inflatable tail cone disposed at an aft end of the reusable launch vehicle.

As best seen in FIG. 11, another preferred embodiment includes a reusable platform 400 having a body 402. An arch wing is not shown in the details of FIG. 10 for clarity. Following the powerless glide phase, the reusable platform 400 begins the landing phase of operation. During the landing phase it is important for the reusable platform 400 to obtain a maximum free glide distance to maximize the RLV operating range. To minimize aerodynamic drag, and following the release of the payload, the reusable platform 400 further includes an inflatable tail cone 404. The inflatable tail cone 404 extends via an extendable shaft 406 from an aft end 408 of the reusable platform 400. Following extension, the inflatable tail cone 404 self-inflates to form a general cone shape providing clearance to the aft end 408. The inflatable tail cone 404 includes a rounded leading face 410 and a tapering body 412. Following the landing phase the inflatable tail cone 404 and the extendable shaft 406 are reloaded through the aft end 408 to a stowed position 414 (shown in phantom).

Figure 12:
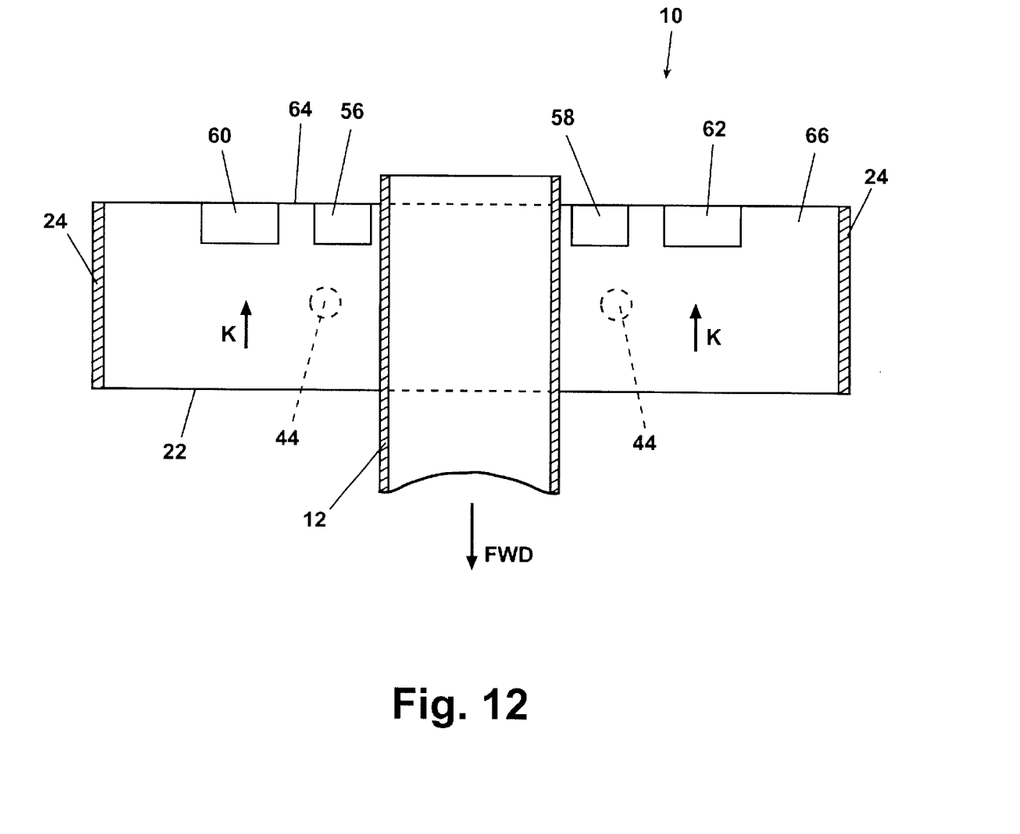
FIG. 12 is a section view taken at Section 12—12 of FIG. 3, showing exemplary flight control surfaces on the trailing edge portions of the lower wing.

Referring now to FIG. 12, the plurality of components installed on the lower wing 22 are shown. A starboard elevon 56, a port elevon 58, a starboard aileron 60, and a port aileron 62 are installed adjacent to an aft edge 64 of an upper surface 66 of the lower wing 22. The starboard elevon 56 and the port elevon 58 are installed inboard of the starboard aileron 60 and the port aileron 62. The positions of the elevons and the ailerons can be modified from those shown in FIG. 12 depending upon the geometry of the lower wing 22 and the flight characteristics of the RLV 10. As previously noted, the curved end plates 24 prevent higher pressure air under the lower wing 22 from bypassing the flight surfaces of the lower wing 22 by escaping to the upper surface 66 of the lower wing 22. Air flow is therefore maintained over the upper surface 66 in the general direction of flow direction arrows K.

The RLV of the present invention offers several advantages. The arch wing design increases the available lift by approximately 50% over a single planar wing. The end plates joining both the upper wing and the lower wing of the arch wing provide directional stability to the air vehicle and maintains air flow over the flight control surfaces of the lower wing in a flow direction generally perpendicular with the surface of the lower wing. The nose assembly design provides additional lift through the use of a fixed angle-of-attack. The forward steering devices are located forward of the center of gravity of the reusable platform therefore generating side thrust and enabling additional pitch control for the RLV. The slender and rounded surfaces of the reusable platform including the swept arch wing reduce the radar cross section.

The capability of achieving hypersonic speeds by boost from a separate launch platform or detachable booster rockets enables the RLV to reach targets at higher than sonic velocities, reducing the likelihood of enemy detection and destruction of the RLV. In the preferred embodiment, by releasing the payload in an aft direction, payload doors which generate aerodynamic drag and radar reflective cavities are not required, therefore the RLV is able to maintain higher than sonic velocities during the powerless flight and weapons release phases. Radar absorbing or radar translucent materials are provided at exterior surfaces of the body, the forward steering device, and for wing portions of the arch wing. A reusable platform of the present invention can be used at both atmospheric and low earth orbital elevation, increasing the range of operation. The arch wing of the present invention in concert with the forward steering devices provide sufficient vertical stabilization such that a rudder, winglets, or other vertical stabilizers known in the art are not required for control of the RLV.

The materials selected for use for the RLV can vary depending upon the application and temperature range of operation. Composite materials can be used for the arch wing provided that the thermal insulation protects the lower temperature capability areas of the arch wing. Higher strength materials including titanium and steels can also be used for the body, the arch wing, the forward steering devices, and the nose assembly of the reusable platform. An RLV of the present invention is capable of velocities up to approximately Mach 30 when provided with thermal insulation materials on selected under-surfaces to protect the under-surfaces during an RLV re-entry phase. The powerless gliding phase is initiated at above Mach speed velocities providing increased range of operation with reduced chance of detection.

The description of the invention is merely exemplary in nature and, thus, variations that do not depart from the gist of the invention are intended to be within the scope of the invention. Such variations are not to be regarded as a departure from the spirit and scope of the invention. For example, a rocket engine is described as the means for achieving launch for the reusable platform of the present invention, however, the RLV can also be launched by other means. The launch phase is performed by a separate craft known in the art carrying the RLV to a desired elevation and/or by booster rockets temporarily attached to the body of the RLV as known in the art.

What is claimed is:

1. A reusable mobile platform comprising:
   a generally tubular shaped body having an aft end, a forward end, and a payload section;
   an arch wing supported at said aft end of said body;
   a nose assembly connected at said forward end, said nose assembly having an upward fixed angle-of-attack to provide lift force at said forward end; and
   a rear release payload discharge face locatable at said aft end;
   wherein said payload section is configurable to support a weapons package for release through said discharge face from said aft end of said package during a non-powered flight phase of said mobile platform.

2. A reusable mobile platform, comprising:
   a generally tubular shaped body having an aft end, a forward end, and a payload section;
   an arch wing supported at said aft end of said body, said arch wing including:
      an upper wing having a continuous, generally planar upper surface and a split, generally planar lower surface, said split lower surface adapted to centrally support said upper wing from said body;
      a lower wing having a modified planar/dihedral shape including a lower surface and a split upper surface, said split upper surface adapted to centrally support said lower wing from said body; and
      a curved end-plate joining said upper wing to said lower wing at opposed distal ends of both said upper wing and said lower wing; and
   a nose assembly connected at said forward end, said nose assembly having an upward fixed angle-of-attack to provide lift force at said forward end;
   wherein said payload section is configurable to support a weapons package for release from said aft end of said package during a non-powered flight phase of said mobile platform.

3. The mobile platform of claim 2, further comprising:
said upper wing and said curved end-plate formed of a radar translucent material;
said lower wing formed from one of a metal and a composite material; and
a radar absorbing material applied to external facing surfaces of said lower wing.

4. The mobile platform of claim 3, wherein said upper wing further comprises:
an upper wing forward point disposed approximately coincident with a body longitudinal axis extending along said tubular shaped body;
a swept wing angle measured from said upper wing forward point to a forward facing point of each of said upper wing distal ends.

5. The mobile platform of claim 4, wherein said lower wing further comprises:
a lower wing forward point disposed approximately coincident with said body longitudinal axis and said swept wing angle; and
said swept wing angle measured from said lower wing forward point to a forward facing point of each of said lower wing distal ends;
wherein said lower wing forward point is positioned forward of said upper wing forward point such that said lower wing shields said upper wing from elevated temperatures occurring when said mobile platform operates at a reentry phase high angle-of-attack.

6. The mobile platform of claim 5, wherein said lower wing, said upper wing and said curved end plate further comprise:
a generally rounded leading edge; and
a generally squared-off trailing edge.

7. The mobile platform of claim 5, further comprising:
said lower wing having a starboard wing half and a port wing half;
a pair of elevons symmetrically spaced about said body longitudinal centerline, one of said elevons disposed on each said split upper surface of said starboard wing half and said port wing half; and
a pair of ailerons each positioned adjacent to one of said elevons.

8. The mobile platform of claim 1, wherein said upward fixed angle-of-attack of said nose assembly varies over a range of approximately 4 degrees to approximately 15 degrees.

9. A reusable, mach-velocity mobile platform comprising:
a generally tubular shaped body having an aft end, a forward end, and a payload section disposed about a longitudinal axis of said body;
an arch wing supported at said aft end of said body;
a nose assembly connected at said forward end, said nose assembly having an upward fixed angle-of-attack to provide lift force at said forward end; and
a plurality of landing devices extendable from said body;
a payload including one of an equipment package and a munitions package stowable in said payload section; and
a rear-release discharge face to discharge said payload from said aft end of said body during said weapons release phase;
wherein said platform is adaptable for operation phases including at least one of a propelled vertical launch phase, a powerless glide phase, a weapons release phase, and a landing phase.

10. The mobile platform of claim 9, wherein said mobile platform further comprises a mobile platform center of gravity wherein said arch wing is positioned aft of said mobile platform center of gravity.

11. The mobile platform of claim 10, further comprising:
a forward steering device having independent starboard and port elements extendable from said body; and
a center of actuation positioned forward of said mobile platform center of gravity such that operation of said starboard and port elements induces a steering force at said forward end of said body.

12. The mobile platform of claim 9, further comprising:
said arch wing including an upper wing and a lower wing;
a plurality of heat shields disposed on both an underside of said body and a lower surface of said lower wing;
said mobile platform operable in said powerless glide phase at a reentry angle-of-attack having a range of approximately 30 degrees to approximately 60degrees measurable from said body longitudinal axis;
wherein said heat shields on said lower wing during said powerless glide phase at said reentry angle-of-attack operably shield said upper wing.

13. The mobile platform of claim 9, further comprising a radar absorbing material disposed about selected portions of said mobile platform to reduce a radar cross section of said mobile platform.

14. The mobile platform of claim 9, further comprising:
a forward steering device configurable as an arched wing canard; and
said arched wing canard having both a port adjustment mechanism and a starboard adjustment mechanism to roll said mobile platform about said mobile platform longitudinal axis;
wherein said port adjustment mechanism and said starboard adjustment mechanism each additionally provide for independent port and starboard steering forces for said mobile platform.

15. The mobile platform of claim 11, wherein said forward steering device includes an expandable air flow opening such that as said forward steering device extends away from said body, an air flow is maintained between said forward steering device and said body.

16. The mobile platform of claim 9, further comprising:
an inflatable tail cone extendable from said aft end of said body; and
said inflatable tail cone having a rounded leading face and a generally cone-shaped tapering body;
wherein said inflatable tail cone is extendable from said aft end of said body after said powerless glide phase to reduce an aerodynamic drag of said mobile platform and extend a range of said landing phase.

17. A method to operate a multiple mach velocity mobile platform comprising the steps of:
coating a plurality of body surfaces of a mobile platform with a radar absorbing material;
loading a weapons package into said mobile platform;
launching said mobile platform to a predetermined altitude at a multiple mach velocity;
controlling a powerless flight phase of said mobile platform using control surfaces mounted at both a forward end and an aft end of said mobile platform; and
discharging said weapons package through an aft end of said mobile platform during a weapons release phase following said powerless flight phase.

18. The method of claim 17, comprising reloading said mobile platform following said powerless flight phase.

19. The method of claim 17, comprising extending a self contained landing gear set during a landing phase following said powerless flight phase and said weapons release phase.

20. The method of claim 17, comprising:
coating a lower wing with said radar absorbing material;
forming an upper wing of a radar translucent material;
joining said lower wing to said upper wing with a radar translucent curved plate pair to form an arched wing;
connecting said arched wing to said aft end; and
controlling said arched wing with both a set of elevons and a set of ailerons.

21. The method of claim 17, wherein said discharging step further comprises dispensing said weapons package in multiple sub-phases to each of a plurality of target areas.

22. The method of claim 17, comprising extending an inflatable tail cone following said discharging step.

23. The method of claim 17, further comprising:
forming a steering device from a radar translucent material;
rotatably mounting said steering device from said forward end of said mobile platform as an opposed pair of devices; and
rotating said steering devices both individually and in unison to generate a steering force at said forward end of said mobile platform.

24. The method of claims 17, further comprising:
compressively loading a looped steering device at said forward end of said mobile platform;
releasing said steering device to an un-loaded position during said powerless flight phase; and
rotating at least a portion of said steering device to generate a steering force at said forward end of said mobile platform.

25. A reusable mach-velocity mobile platform adaptable for a weapons release powerless glide phase of operation, comprising:
a generally tubular shaped body having an aft end, a forward end, and a payload section disposed about a longitudinal axis of said body;
an arch wing supported at said aft end of said body;
a payload including one of an equipment package and a munitions package stowable in said payload section; and
a rear-release discharge face to discharge said payload from said aft end of said body during said weapons release phase.

* * * * *